(12) United States Patent
Hsiao et al.

(10) Patent No.: US 7,398,002 B2
(45) Date of Patent: Jul. 8, 2008

(54) VIDEO EDITING METHOD AND DEVICE FOR EDITING A VIDEO PROJECT

(75) Inventors: Kenny Hsiao, Keelung (TW); Yang Lu, Keelung (TW)

(73) Assignee: Corel TW Corp., Taipei (TW)

( * ) Notice: Subject to any disclaimer, the term of this patent is extended or adjusted under 35 U.S.C. 154(b) by 1068 days.

(21) Appl. No.: 10/173,662

(22) Filed: Jun. 19, 2002

(65) Prior Publication Data

US 2003/0002851 A1  Jan. 2, 2003

(30) Foreign Application Priority Data

Jun. 28, 2001  (TW) ............................... 90115858 A (51) Int. Cl.
*G11B 27/00* (2006.01)
*H04N 5/91* (2006.01)
*G06T 13/00* (2006.01)

(52) U.S. Cl. ..................... 386/52; 386/46; 386/55; 386/56; 345/473; 345/474; 345/475

(58) Field of Classification Search .............. 386/46, 386/52, 53, 54, 55, 56; 345/473, 474, 475
See application file for complete search history.

(56) References Cited

U.S. PATENT DOCUMENTS 5,339,393 A * 8/1994 Duffy et al. ............... 715/723
5,826,102 A * 10/1998 Escobar et al. ............. 715/202
5,999,173 A * 12/1999 Ubillos ....................... 715/724
6,414,686 B1 * 7/2002 Protheroe et al. ........... 345/474
6,415,095 B1 * 7/2002 Morishima et al. .......... 386/55
6,546,188 B1 * 4/2003 Ishii et al. ................... 386/52
6,694,087 B1 * 2/2004 Weaver ....................... 386/52

FOREIGN PATENT DOCUMENTS

| JP | 06-043839 | 2/1994 |
| JP | 06-086210 | 3/1994 |
| JP | 07-303209 | 11/1995 |
| JP | 10-031663 | 2/1998 |
| JP | 10-200855 | 7/1998 |
| JP | 2000-059720 | 2/2000 |
| JP | 2000-149499 | 5/2000 |

* cited by examiner

*Primary Examiner*—Thai Q. Tran
*Assistant Examiner*—Syed Y. Hasan
(74) *Attorney, Agent, or Firm*—Rabin & Berdo, PC (57) ABSTRACT

A video editing method for editing a video project is for user to edit video clips and transition effects. The method firstly provides a timeline and multiple tracks along the timeline. Then the video clips and transition effects are inserted into the corresponding tracks. Next, the timeline is cut into multiple segments so that each of the segments corresponds to distinguishable combination of the video clips and the transition effects. And for each of the segments, the invention displays each of the tracks with a limited number of thumbnails derived from the corresponding video clips, or with an icon indicating the corresponding transition effect. This method enables users to edit video projects on multi-tracks without the need to change the unit of timeline often.

10 Claims, 7 Drawing Sheets

VIDEO EDITING METHOD AND DEVICE FOR EDITING A VIDEO PROJECT

This application incorporates by reference of Taiwan application Serial No. 90115858, Filed Jun. 28, 2001.

BACKGROUND OF THE INVENTION

1. Field of the Invention

This invention relates to a device and a method of editing video projects, and more particularly, to a video editing device and method for editing video projects concerned with the character of editing methods of timeline and storyboard.

2. Description of the Related Art

Figure 1:
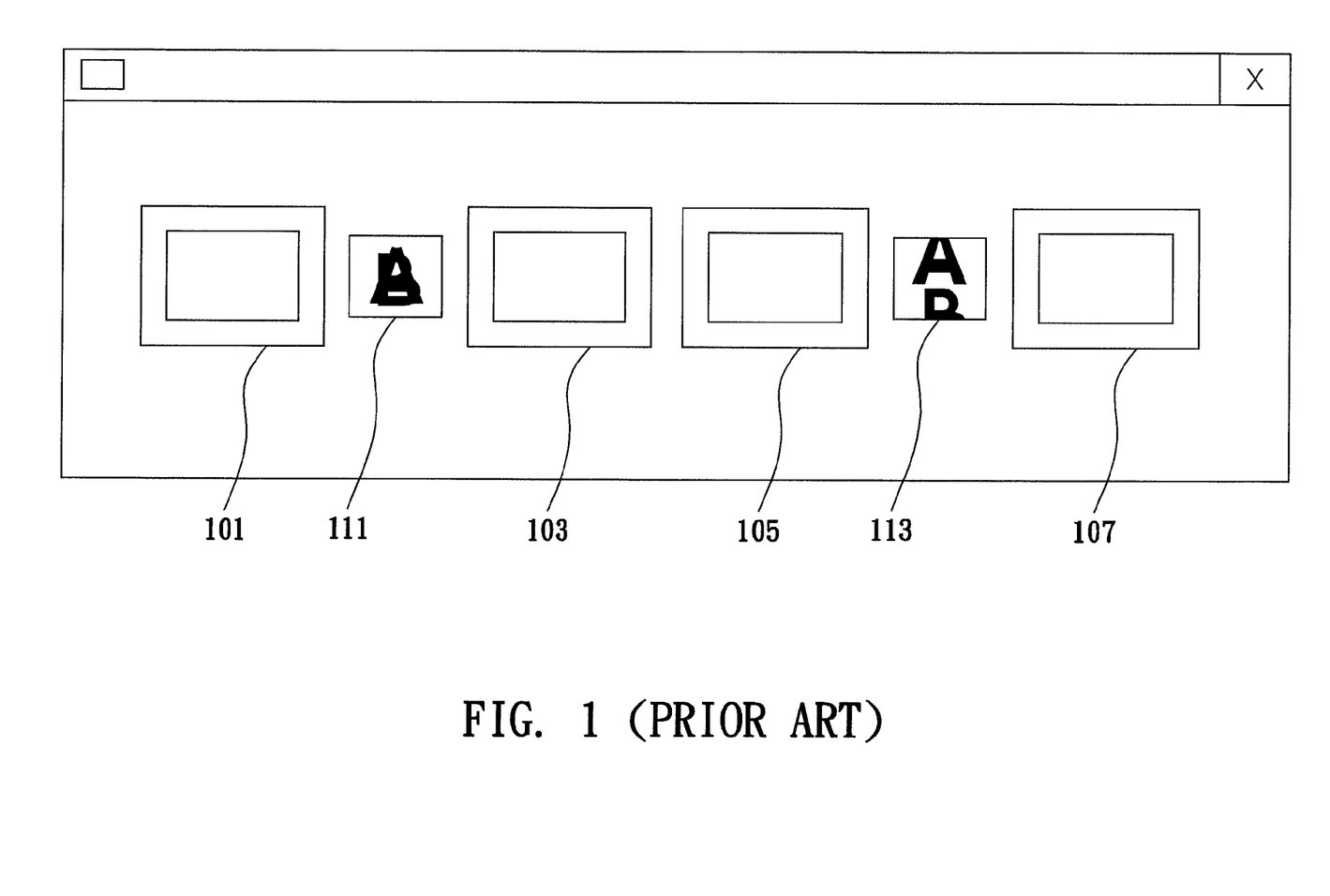
FIG. 1 is a sketch diagram of the screen of editing video programs by the method of storyboard.

In the past, film-clip persons must use many projectors and clipping facilities to edit several tapes into a video program. Due to the improvement of modern technology, film-clip persons are able to record tape into a memory device of a computer. And by directly using a digital camcorder to record digital film, they can make a video program via a computer video editing software. Thus, it is more convenient and can achieve better effect of film by using computers instead of hardware facilities to edit video programs Among the present editing software, there is a method of storyboard to edit video programs. Please refer to FIG. 1. An editing user arranges order of a video clip 101, a video clip 103, a video clip 105 and a video clip 107. Moreover, the user inserts a transition effect 111 between the video clip 101 and the video clip 103, and inserts a transition effect 113 between the video clip 105 and the video clip 107 separately. And the transition effect is for showing special transition effect when there happens transition between two video clips. The effect, for example, is achieved by using the method of overlapping two video clips, changing films from top to down and so on.

Figure 2:
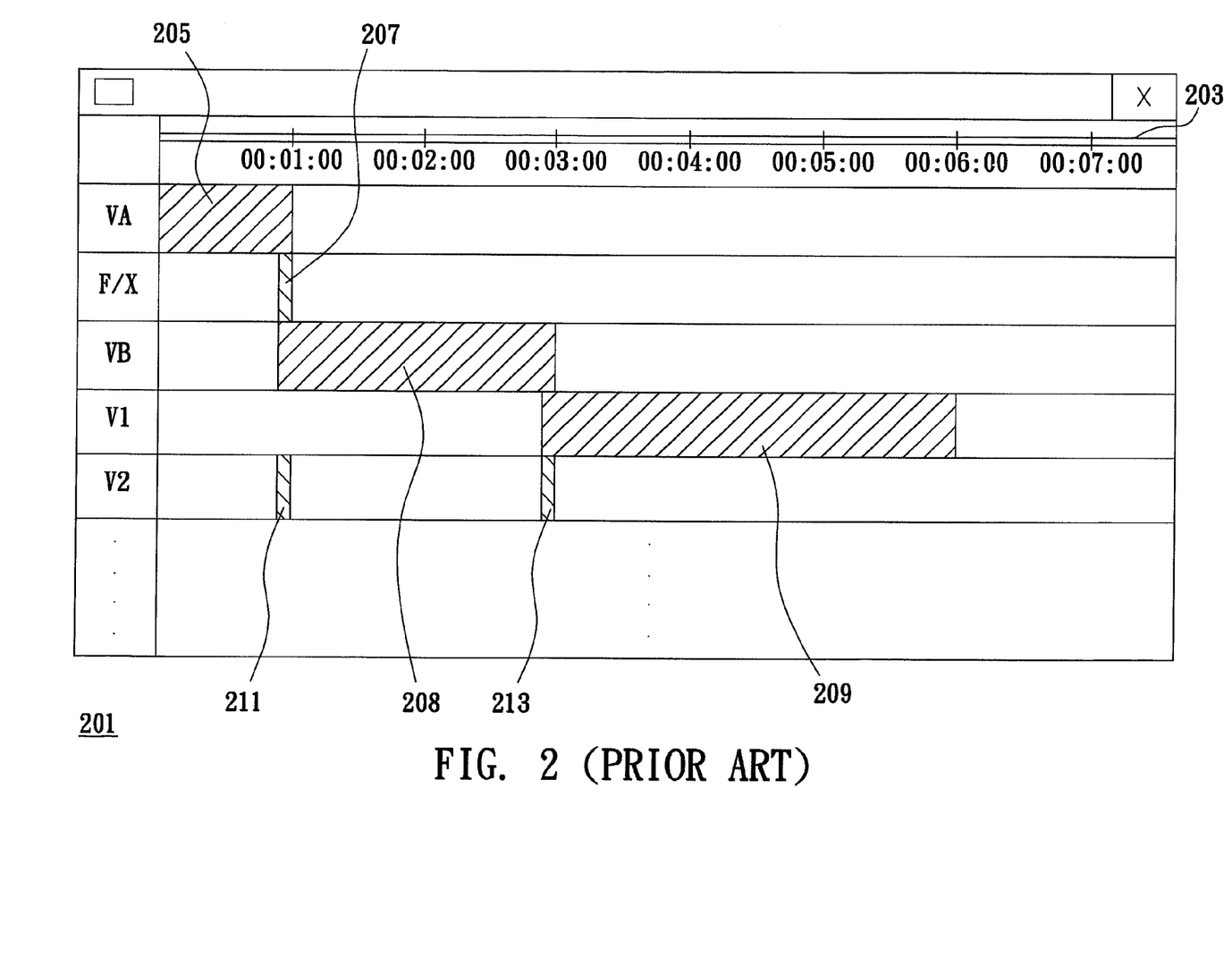
FIG. 2 is a sketch diagram of the screen of editing video programs by the method of timeline.

However, there is a disadvantage to edit video programs by the method of storyboard: only two tracks of video clip and one transition effect can be edited. There is no multi-track editing. The system of editing video program, the method of displaying timeline, can ameliorate the above problem. Please refer to FIG. 2. It shows the illustration of editing scenes of video programs by the method of timeline. A screen 201 in FIG. 2 consists of a timeline 203 and includes multiple tracks: a video track VA, a transition track F/X, a video track VB, an overlay track V1, an overlay track V2, and so on. These tacks are for performing video clips, transition effects, and video clips with an overlay option (such as title information, footnotes, and so on). And the direction of these tracks is along the direction of timeline 203. General speaking, the transition effect of video clips is edited on the transition track F/X. At FIG. 2, it is known that users add a video clip 205, a video clip 208, a video clip with an overlay option 209, a video clip with an overlay option 211, a video clip with an overlay option 213, and a transition effect 207, into the above mentioned tracks and proceed to edit these clips.

Figure 3:
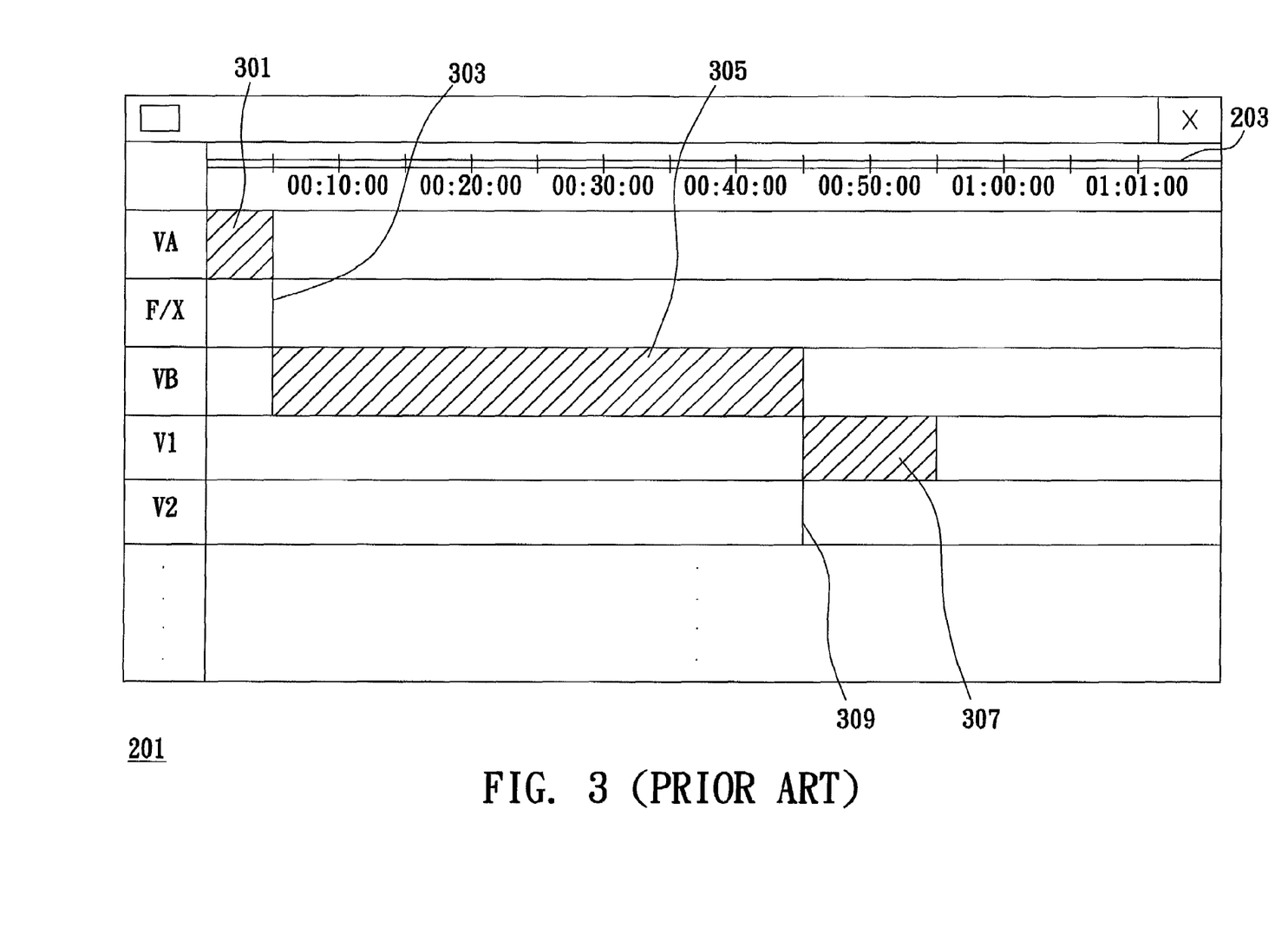
FIG. 3 is a sketch diagram of a screen with a long-time clip according to FIG. 2.

As the above mention, multi-track editing can be achieved by editing video programs with the method of timeline. And that causes video program full of more variable effects. However, there is a disadvantage within this method. Please refer to FIG. 3. At FIG. 3, since the length of a video clip 305 is 40 minutes, a transition effect 303, and a video clip with an overlay option 309 will be shrunk and users cannot easily select and edit them by a mouse when displaying all videos in a full screen. At this moment, users have to decrease the unit of the timeline 203 in order to proceed clicking and selecting editing shorter length of video clips, transition effects, or video clips with an overlay option. Therefore, it is known that a user needs to often change the unit of a timeline 203 to edit video programs when there is a long-time video clip in a video program. It is very inconvenient for a user.

SUMMARY OF THE INVENTION

It is therefore an object of the invention to provide a video editing device and method for editing a video project for users to proceed multi-track video program editing. When the length of video clips or transition effect differs widely, users can edit the shorter transition effects or video clips without the need to change the unit of timeline often.

It is an object of the invention to provide a video editing method and device for editing a video project. The video project includes a plurality of video clips and transition effects allocated between adjacent video clips. The invention firstly provides a timeline and multiple tracks along the timeline. Then video clips and transition effects are inserted into the corresponding tracks. Next, the timeline is cut into a plurality of segments so that each of the segments corresponds to a distinguishable combination of the video clips and the transition effects. Next, for each of the segments, the invention displays each of the tracks with a limited number of thumbnails derived from the corresponding video clips, or with an icon indicating the corresponding transition effect.

BRIEF DESCRIPTION OF THE DRAWINGS

Objects, features, and advantages of the invention will become apparent from the following detailed description of the preferred but non-limiting embodiments. The description is made with reference to the accompanying drawings, in which.

DESCRIPTION OF THE PREFERRED EMBODIMENT

A video editing device and method disclosed in the invention are for editing a video project. The video project includes several video clips and transition effects allocated between clips. And the transition effect can be the special video effect between adjacent clips when transmitting. Wherein, at least one of the video clips of the video project includes an overlay attribute, a moving path attribute, or a filter attribute. The overlay attribute is defined for superimposing a video clip over a background clip. The moving path attribute is defined a route of a corresponding clip. And the filter attribute is for enhancing or improving a corresponding clip.

Figure 4:
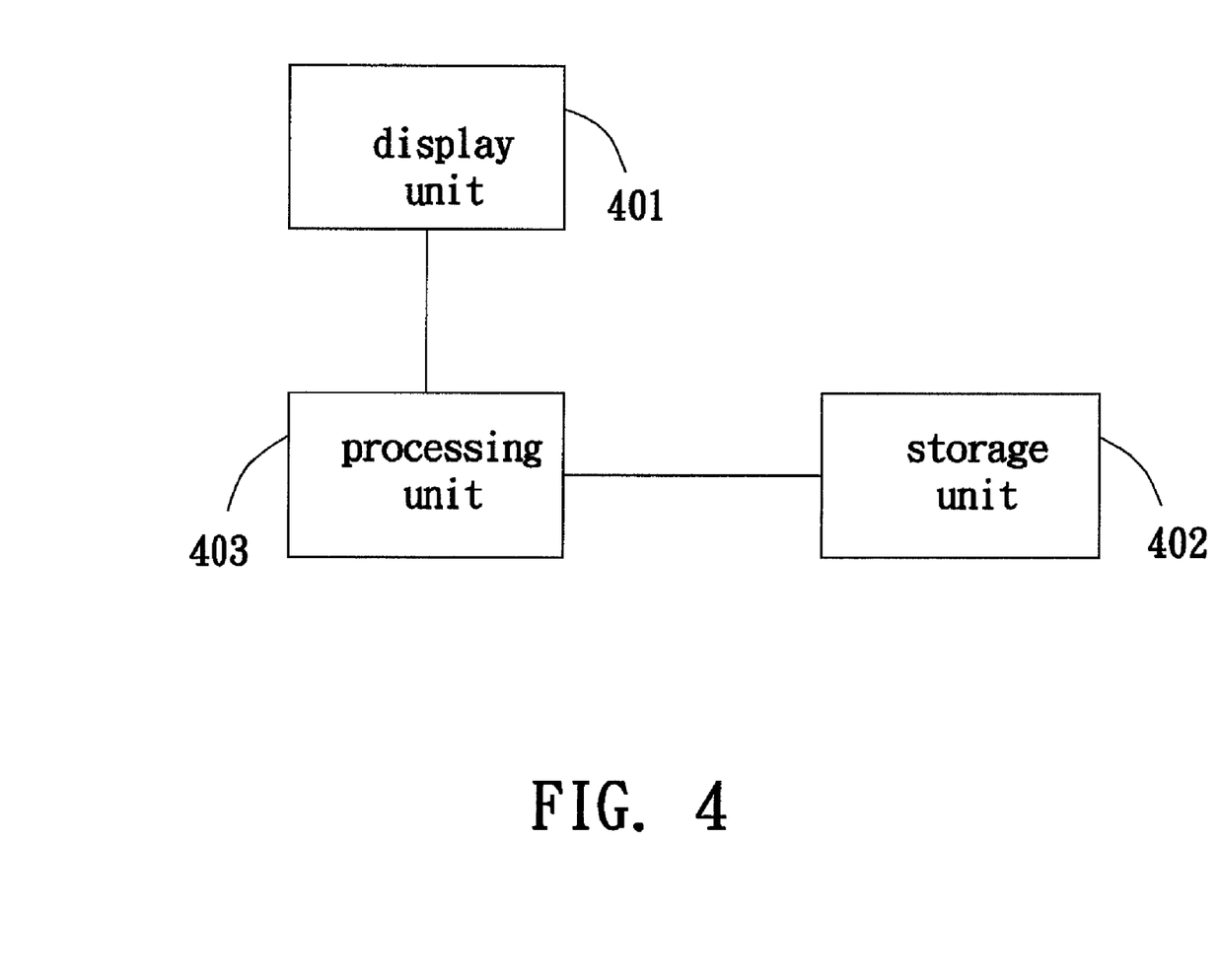
FIG. 4 is a block diagram of a video editing device for editing a video project according to a preferred embodiment of the invention.

Next please refer to FIG. 4. It illustrates a block diagram of a video editing device for editing a video project according to the preferred embodiment of the invention. As FIG. 4 shows, the video editing device includes a display unit 401, a storage unit 402, and a processing unit 403. The display unit 401 is for displaying video clips and transition effects in a video project. And the storage unit 402 is for storing all video clips and transition effects.

Figure 5:
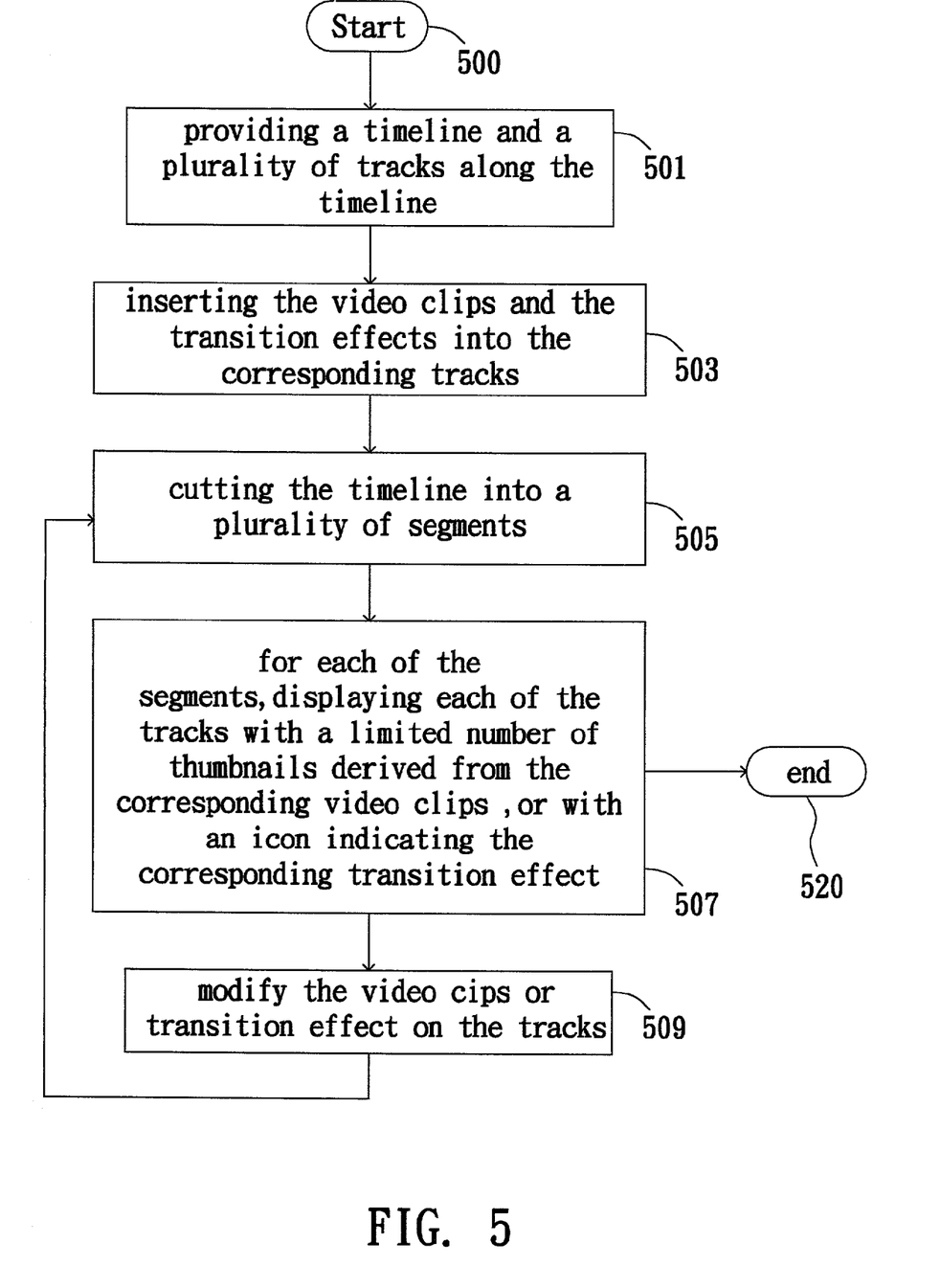
FIG. 5 is a flowchart of a video editing method for editing a video project according to a preferred embodiment of the invention.
Figure 6:
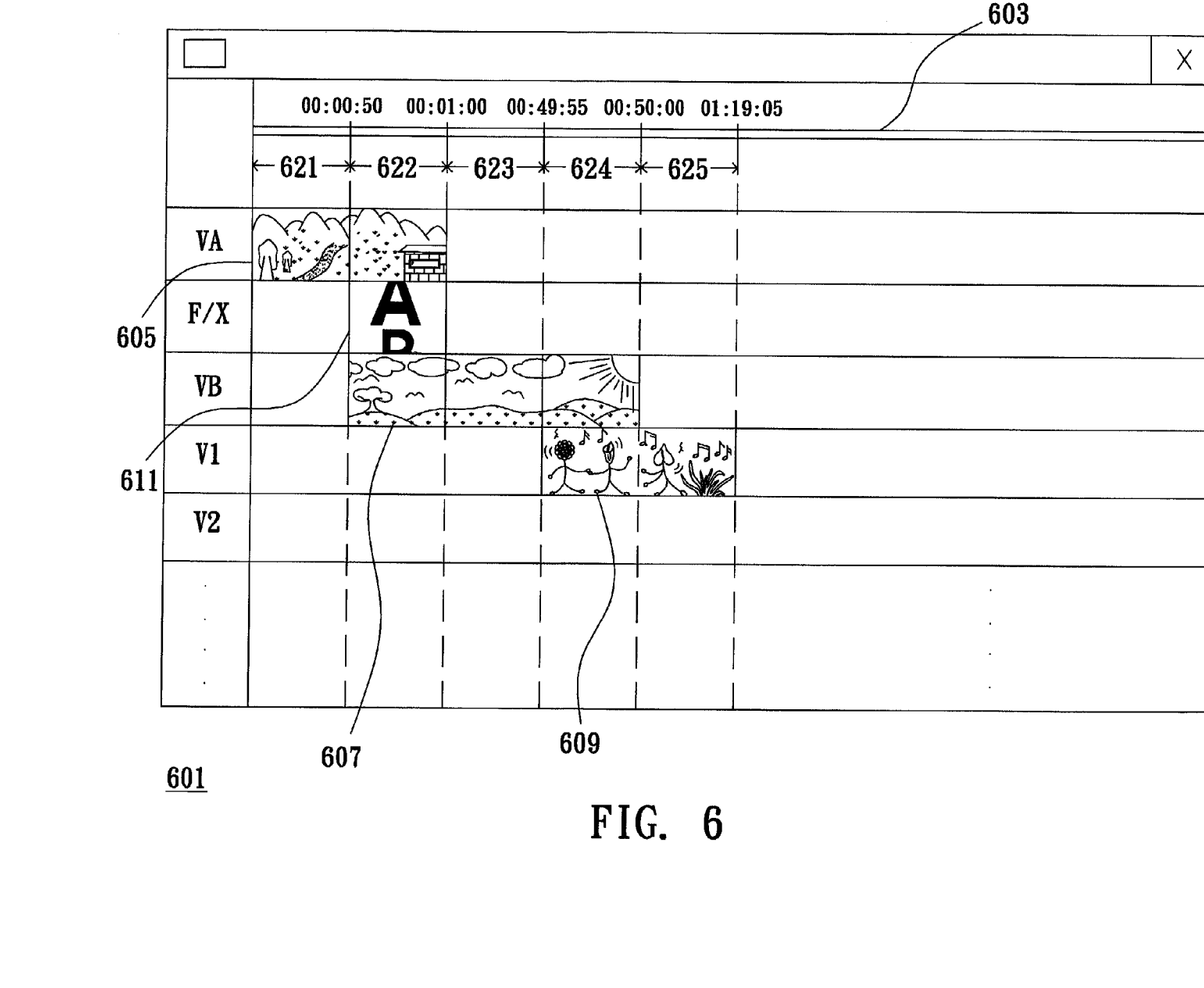
FIG. 6 is a sketch diagram of editing the screen of the video project according to the method of the invention.

The processing unit 403, which connects in pair with the display unit 401 and the storage unit 402, is for executing the video editing method for editing a video project of the preferred embodiment of the invention. Please refer to FIG. 5 and FIG. 6. FIG. 5 illustrates a flowchart of the video editing method for editing a video project according to the preferred embodiment of the invention, and FIG. 6 is an illustration of editing a video project on a screen of the display unit 401 by the method of this invention. The method of this invention firstly starts at Step 501 in FIG. 5. The method provides a timeline 603 and a plurality of tracks along the timeline 603 on the screen 601 of the display unit 401. And the tracks include a video track VA, a video track, F/X, a transition track VB, an overlay track V1, an overlay track V2, and so on. These tracks are for storing video clips and transition effects in order to proceed editing, and their direction is along the direction of the timeline 603. Next, the method proceeds to Step 503.

At Step 503, the processing unit 403 is for users to insert video clips and transition effects into the corresponding tracks on the screen 601. The video clip 605, video clip 607, video clip 609, and transition effects 611 are separately inserted into the video track VA, the video track VB, the overlay track V1, and the transition track F/X.

Next, at step 505, according to the starting time and ending time of the video clips and transition effects, the timeline 603 is cut into multiple segments so that each of the segments corresponds to a distinguishable combination of the video clips and the transition effect. Please refer to FIG. 6 at the same time. According to the starting time and ending time of the video clips and transition effect 611, the timeline 603 is split into five segments: Segment 621, Segment 622, Segment 623, Segment 624, and Segment 625. And when the video project starts to be played, within the interval of Segment 621, the processing unit 403 only plays the video clip 605. And within the interval of Segment 622, the processing unit 403 simultaneously plays the video clip 605, the transition effect 611, and the video clip 607. Then within the interval of Segment 623, the processing unit 403 only plays the video clip 607, and within the interval of Segment 624, the processing unit 403 simultaneously plays the video clip 607, and the video clip 609. Finally, the processing unit 403 plays the video clip 609 within the interval of Segment 625.

Figure 7:
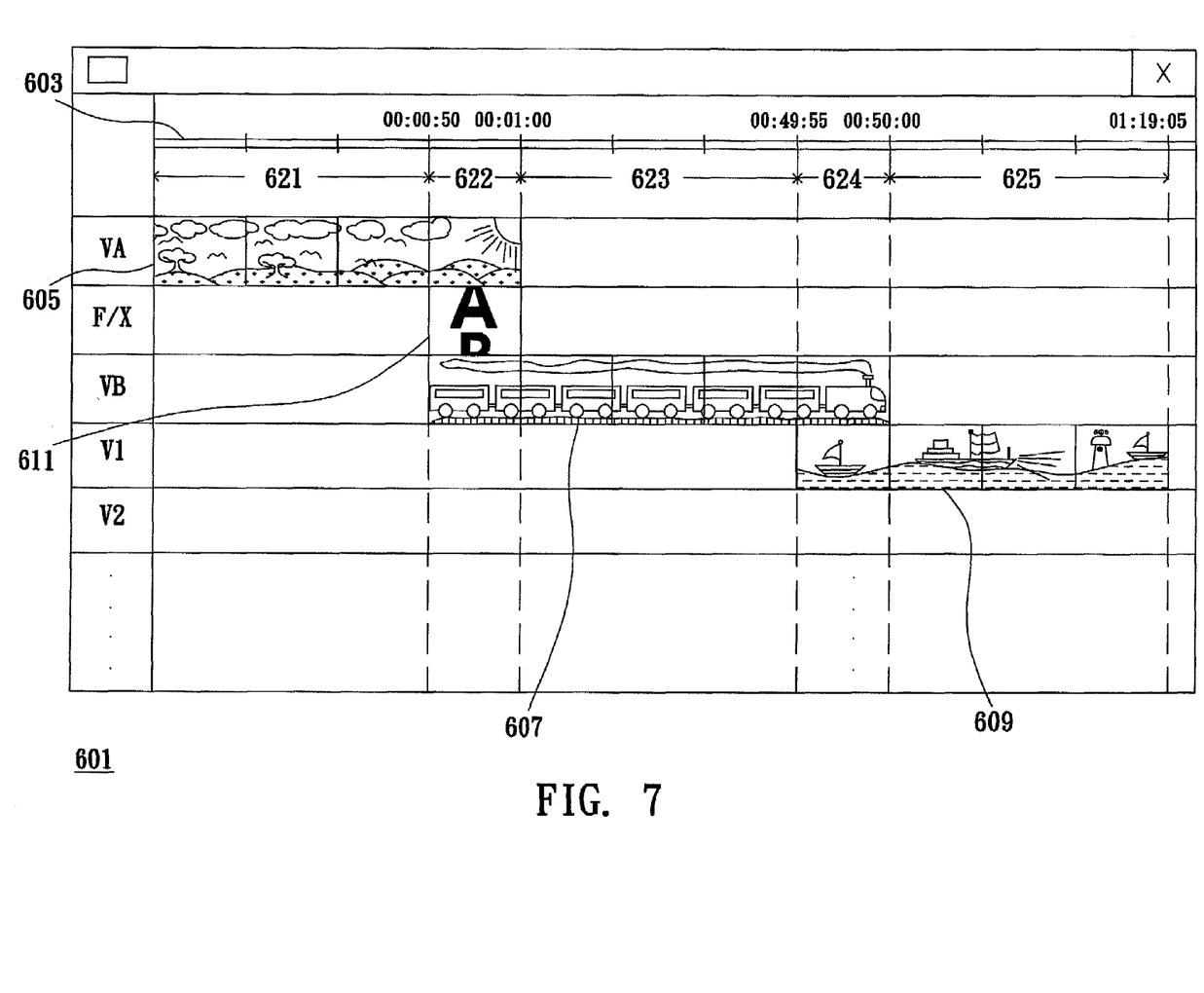
FIG. 7 is another sketch diagram of editing the screen of the video project according to the method of the invention.

Next, at Step 507, for each of the segments, a limited number of thumbnails are derived from the corresponding video clip to symbolize the part of the video clip on the corresponding track and the transition effect 611 is displayed with an icon. And the limited number of thumbnails could be the limited number of frames selected from the corresponding video clip. As FIG. 6 illustrates, one thumbnail derived from a video clip is used to symbolize part of the corresponding video clip in each segment. In addition, multiple thumbnails could be used to symbolize part of video clips in each segment. For example, three thumbnails are used to symbolize but the invention is not limited thereto. Please refer to FIG. 7. FIG. 7 illustrates another illustration of editing a video project according to the method of the invention. In FIG. 7, the clipping part of the video clip 605 is represented as three thumbnails in Segment 621. After Step 507, if the user does not proceed editing, the processing unit 403 will finish the method; otherwise the method proceeds to Step 509.

At Step 509, the video clips and transition effects on the screen 601 could be modified; and then the method goes back to Step 505. At Step 509, users can add, delete, or edit a video clip or transition effect. Wherein, the editing of video clips or transition effects means to change the track or location of video clips or transition effects on the Screen 601. That is to change the playing sequence or time of video clips or transition effects.

The invention, which is a video editing device and method for editing a video project revealed by the above embodiments, includes the following advantages:

1. Users can edit multi-track video projects to achieve various vision effects.

2. When there is a longer video clip, users do not need to change the unit of a timeline and can click to select and edit the shorter video clips or transition effects. It is very convenient for users to edit.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video editing method for editing a video project, the project including a plurality of video clips and a plurality of transition effects allocated between adjacent video clips, the method comprising the steps of:

providing a timeline having a plurality of time units and a plurality of tracks along the timeline;

inserting the video clips and the transition effects of the video project into the corresponding tracks;

cutting the timeline into a plurality of segments according to a starting time and an ending time of the video clips and the transition effects, so that each of the segments corresponds to a distinguishable combination of the video clips and the transition effects, the time units representing variable lengths of time with respect to each other so as to only scale down at least one first segment that corresponds to a long video clip such that a beginning and an end of the long video clip are visible at the same time while viewing other ones of the video clips and the transition effects, wherein each segment occupies at least one of the time units for editing so that at least one second segment including a short transition effects remains visible at a same time as other ones of the segments, wherein the length of the time units having equal time intervals can be varied by the user; and for each of the segments, displaying each of the tracks with a limited number of thumbnails derived from the corresponding video clips, or with an icon indicating the corresponding transition effect.

2. The video editing method according to claim 1, wherein at least one of the video clips of the video project further comprises an overlay attribute, for superimposing over a background clip.

3. The video editing method according to claim 1, wherein at least one of the video clips of the video project further comprises a moving path attribute, for defining a route of the corresponding clip.

4. The video editing method according to claim 1, wherein at least one of the video clips of the video project further comprises a filter attribute, for enhancing or improving the corresponding clip.

5. The video editing method according to claim 1, wherein the limited number of thumbnails is the limited number of frames selected from the corresponding video clip.

6. A video editing device for editing a video project, the project including a plurality of video clips and a plurality of transition effects allocated between adjacent video clips, the video editing device comprising:
- means for providing a timeline having a plurality of time units and a plurality of tracks along the timeline;
- means for inserting the video clips and the transition effects of the video project into the corresponding tracks;
- means for cutting the timeline into a plurality of segments according to a starting time and an ending time of the video clips and the transition effects, so that each of the segments corresponds to a distinguishable combination of the video clips and the transition effects, the time units representing variable lengths of time with respect to each other so as to only scale down at least one first segment which corresponds to a long video clip such that a beginning and an end of the long video clip are visible at the same time while viewing other ones of the video clips and the transition effects, wherein each segment occupies at least one of the time units for editing so that at least one second segment including a short transition effects remains visible at a same time as other ones of the segments,
- wherein the length of the time units having equal time intervals can be varied by the user; and for each of the segments, with a limited number of thumbnails derived from the corresponding video clips, or with an icon indicating the corresponding transition effect.

7. The video editing device according to claim 6, wherein at least one of the video clips of the video project further comprises an overlay attribute, for superimposing over a background clip.

8. The video editing device according to claim 6, wherein at least one of the video clips of the video project further comprises a moving path attribute, for defining a route of the corresponding clip.

9. The video editing device according to claim 6, wherein at least one of the video clips of the video project further comprises a filter attribute, for enhancing or improving the corresponding clip.

10. The video editing device according to claim 6, wherein the limited number of thumbnails is the limited number of frames selected from the corresponding video clip.

* * * * *